United States Patent
Yokoyama et al.

(10) Patent No.: US 6,863,330 B2
(45) Date of Patent: Mar. 8, 2005

(54) SEAT APPARATUS FOR A VEHICLE

(75) Inventors: Takashi Yokoyama, Toyota (JP);
Hiroyuki Okazaki, Chiryu (JP);
Yukifumi Yamada, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/628,450

(22) Filed: Jul. 29, 2003

(65) Prior Publication Data

US 2004/0104589 A1 Jun. 3, 2004

(30) Foreign Application Priority Data

Jul. 29, 2002 (JP) ........................................ 2002-219864
Jul. 29, 2002 (JP) ........................................ 2002-219865

(51) Int. Cl.⁷ ................................................ B60N 2/02
(52) U.S. Cl. ................................ 296/65.03; 296/65.09; 248/503.1; 297/336
(58) Field of Search .......................... 296/65.03, 65.05, 296/65.09; 297/335, 336; 248/503.1

(56) References Cited

U.S. PATENT DOCUMENTS

| | | | | |
|---|---|---|---|---|
| 2,215,127 A | * | 9/1940 | Merrill | ........................ 297/336 |
| 4,700,989 A | * | 10/1987 | Ercilla | ........................ 297/331 |
| 5,282,662 A | * | 2/1994 | Bolsworth et al. | ....... 296/65.03 |
| 5,498,051 A | | 3/1996 | Sponsler et al. | |
| 5,765,894 A | | 6/1998 | Okazaki et al. | |
| 6,065,804 A | | 5/2000 | Tanaka et al. | |
| 6,152,515 A | * | 11/2000 | Wieclawski | .............. 296/65.03 |
| 6,412,849 B1 | * | 7/2002 | Fast | ........................ 296/65.03 |
| 6,561,583 B2 | * | 5/2003 | Glaser | ........................ 297/325 |

FOREIGN PATENT DOCUMENTS

| | | |
|---|---|---|
| DE | 39 16 546 C2 | 8/1993 |
| DE | 198 46 031 C2 | 1/2002 |
| EP | 0 500 412 B1 | 8/1992 |
| JP | 6-107050 A | 4/1994 |

* cited by examiner

*Primary Examiner*—Dennis H. Pedder
(74) *Attorney, Agent, or Firm*—Burns, Doane, Swecker & Mathis, L.L.P.

(57) ABSTRACT

A seat device adapted to be fixed to engagement members on a vehicle floor includes a first engagement member supporting a front portion of the seat device, a second engagement member supporting a rear portion of the seat, a first lock engagable with the first engagement member, a second lock engagable with the second engagement member. The first lock is supported on the seat device and includes a bracket rotatably supported relative to the seat device and being engagable with the first engagement member and a hook member supported on the bracket and being able to maintain an engagement of the bracket with the first engagement member. A contact portion is provided on the hook member for contacting on a portion of the seat device to prevent a release operation of the hook member when the bracket is out of a predetermined position range relative to the seat device.

8 Claims, 6 Drawing Sheets

SEAT APPARATUS FOR A VEHICLE

This application is based on and claims priority under 35 U.S.C. § 119 with respect to Japanese Application No. 2002-219864 and No. 2002-219865, both of these applications were filed on Jul. 29, 2002, the entire content is incorporated herein by reference.

TITLE OF INVENTION

Seat apparatus for a vehicle

FIELD OF THE INVENTION

This invention generally relates to a seat apparatus for a vehicle. More particularly, the seat apparatus pertains to a vehicle seat which can be folded, tumbled or removed for multipurpose use of the vehicle room space such as by expanding for loading cargo.

BACKGROUND OF THE INVENTION

A vehicle seat for multipurpose use, for a example disclosed in U.S. patent application Ser. No. 5,498,051, usually is provided with a first lock unit provided with a rotational axis and supported on the vehicle floor at the front end portion of the seat device. Also, the seat has a second lock unit at the rear end portion of the seat device. The first and second lock unit are arranged to be able to engage with or release from a first and a second strikers fixed on the vehicle floor.

The second lock unit is released from the second striker, then the seat can be rotated around the rotational axis of the first lock unit and made to stand up as its front portion to be lower, that is, as the seat to be in tumbled condition. Further, by operating a hook installed on the first lock unit to release the engagement from the first striker, the seat can be removed from the floor. Thus, the cargo space on the floor can be expanded.

Usually, in the seat, as above mentioned, which can be arranged to be in tumbled condition, the hook of the first lock unit is possible to be released even when the seat is not in tumbled condition. For example, even when the seat is in sitting use condition of the occupant, the first lock unit may be released. It is difficult to restore the seat to be in sitting use condition again, because the seat may take several postures.

Also, the distance between the first and second lock units and the first and second strikers varies depending on manufacturing or assembling tolerance. This generates difficulty of locking operation or over load on the lock units when the seat is restored to be in the sitting use condition from the tumbled condition.

SUMMARY OF INVENTION

According to a first aspect of the present invention, the seat device 1 can be released from the vehicle floor only when the seat is in tumbled condition, that is, the seat device is rotated around an axis to be in almost upright position on the floor, and fail safe for the seat arrangement operation is obtained.

According to a second aspect of the present invention, a long hole is provided on a first bracket of a first lock unit which supports a seat. The rotation axis is arranged to be movable in the long hole, and on the restoring process of the seat from the tumbled condition to normal sitting use condition, by a cam hole and a pin which are provided on the first and second bracket, the seat is shifted along the long hole to a predetermined position for making the second lock unit can engage.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
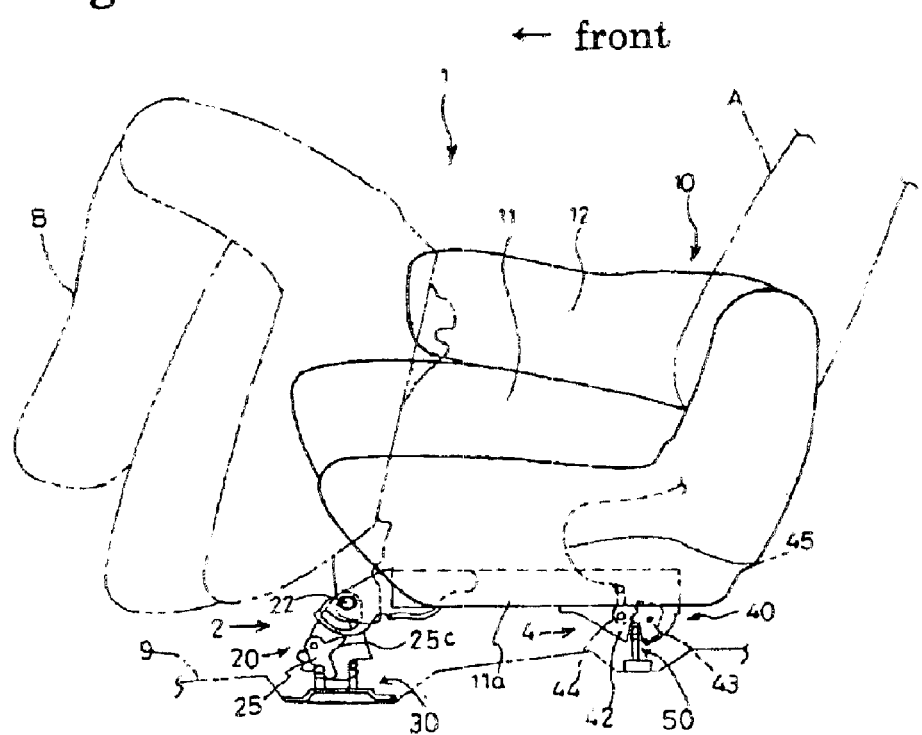
FIG. 1 is a side view of a seat device in folded condition according to an embodiment of the present invention.

A seat device 1 for a vehicle includes a seat 10, a first lock 2 which supports a front portion of the seat 10 on a vehicle floor 9 and a second lock 4 which supports a rear portion of the seat device 1 on a vehicle floor 9. A sitting use condition of the seat 10 is shown by two dots line A, and a folded condition is shown by solid line in FIG. 1.

The seat 10 is provided with a seat cushion 11 and a seat back 12, a seat reclining adjuster (not shown) which is disposed between the seat cushion 11 and the seat back 12. The seat reclining adjuster works to adjust the seat back 12 angle position in the sitting condition and also to the folded condition. The back side of the seat back 12 is available for use as a table in the vehicle space, when the seat back 12 is folded over the seat cushion 11.

As further shown by two dots line B in FIG. 1, the seat 10 can be turned forward (counter clockwise direction in FIG. 1) by releasing the second lock 4 from the floor 9. Then the seat cushion 11 stands up to almost upright position as its front end to be lower, that is, to be in tumbled condition. Then, the seat 10 can be removed from the floor 9 by operating the first lock 2 and releasing the first lock 2.

Figure 2:
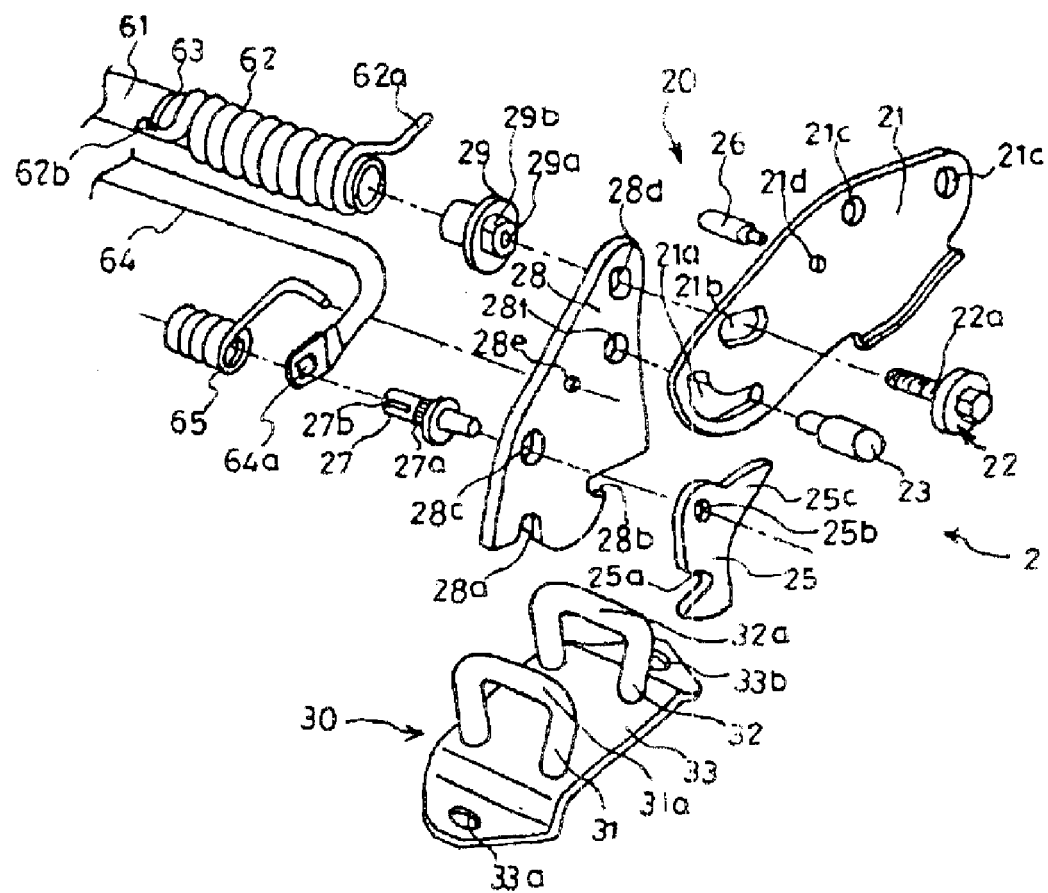
FIG. 2 is an exploded perspective view the first locking mechanism of the seat device.

As shown FIG. 1 and FIG. 2, the first lock 2 includes a first lock unit 20 displaced on the seat 10 and a first striker 30 (a first engaging member). The first striker 30 has a base 33 fixed on the floor 9 via holes 33a, 33b and two engagement rods 31, 32. The first lock unit 20 has a lower bracket 28, and the lower bracket 28 has two grooves 28a, 28b engaging with horizontal engagement portions 31a, 32a formed on the engagement rods 31, 32. The groove 28a engaging with the front horizontal engagement portion 31a has a mouth opening downward, and the groove 28b engaging with the rear horizontal engagement portion 32a has a mouth opening rearward.

As shown in FIG. 2, the first lock unit 20 includes an upper bracket 21 rotatably connected by a rotational axis 22 on the lower bracket 28. The upper bracket 21 is fixed on a front and under surface portion of a frame 11a of the seat cushion 11 via fixing holes 21c. A fixing nut 29 is fixed in a hole 28d on an upper end portion of the lower bracket 28 at a boss portion 29b, and the rotational axis 22 of the upper bracket 21 is fixed on a screw portion 29a of the fixing nuts 29. Along hole 21b is formed on the upper bracket 21, the rotational axis 22 penetrates through the long hole 21b. The long hole 21b extends rearward when the seat cushion 11 is supported by both the first and second locks 2, 4. The width of the long hole 21b is almost equal with the diameter of a boss portion 22a of the rotational axis 22. A cam hole 21a with curved profile is formed on the opposite side of the fixing hole 21c relative to the long hole 21b. A pin 23 is fixed in a hole 28f on the side surface of the lower bracket 28, and the pin 23 is inserted in the cam hole 21a. The each end of the cam hole 21a and the pin 23 contact each other, when the lower bracket 28 rotates relative to the upper bracket 21, then the relative rotation range of the lower bracket 28 and the upper bracket 21 is defined.

As shown in FIG. 2, on the side surface of the lower bracket 28, a hook 25 is rotatably supported in a hole 28c by a pin 27 which is fixed in a hole 25b on the hook 25. The hole 28c on the lower bracket 28 is displaced at the location under the pin 23 and over the groove 28a. At the lower part of the hook 25, a groove 25a opening forward is formed, and the groove 25a can maintain the engagement rod 31 in the groove 28a by an engagement of the groove 25a with the horizontal engagement portion 31a of the engagement rod 31.

A slit 27b is formed on the pin 27, and one end of a coil spring 65 is hooked in the slit 27b and the other end of the coil spring 65 is hooked in a hole 28e formed on the lower bracket 28. The coil spring 65 applies rotational force to the hook 25 to engage the hook 25 with the engagement rod 31. On an outer surface of the pin 27, plural grooves 27a are formed. For fixing an operation lever 64 with the pin 27, a hole 64a with plural grooves is formed on the operation lever 64. The other end portion of the operation lever 64 is fixed with the pin 27 of the first lock unit 20 installed on the other side of the seat 10. When the operation lever 64 is pulled upwardly against the force of the coil spring 65, the hook 25 is released from the engagement rod 31.

Figure 3:
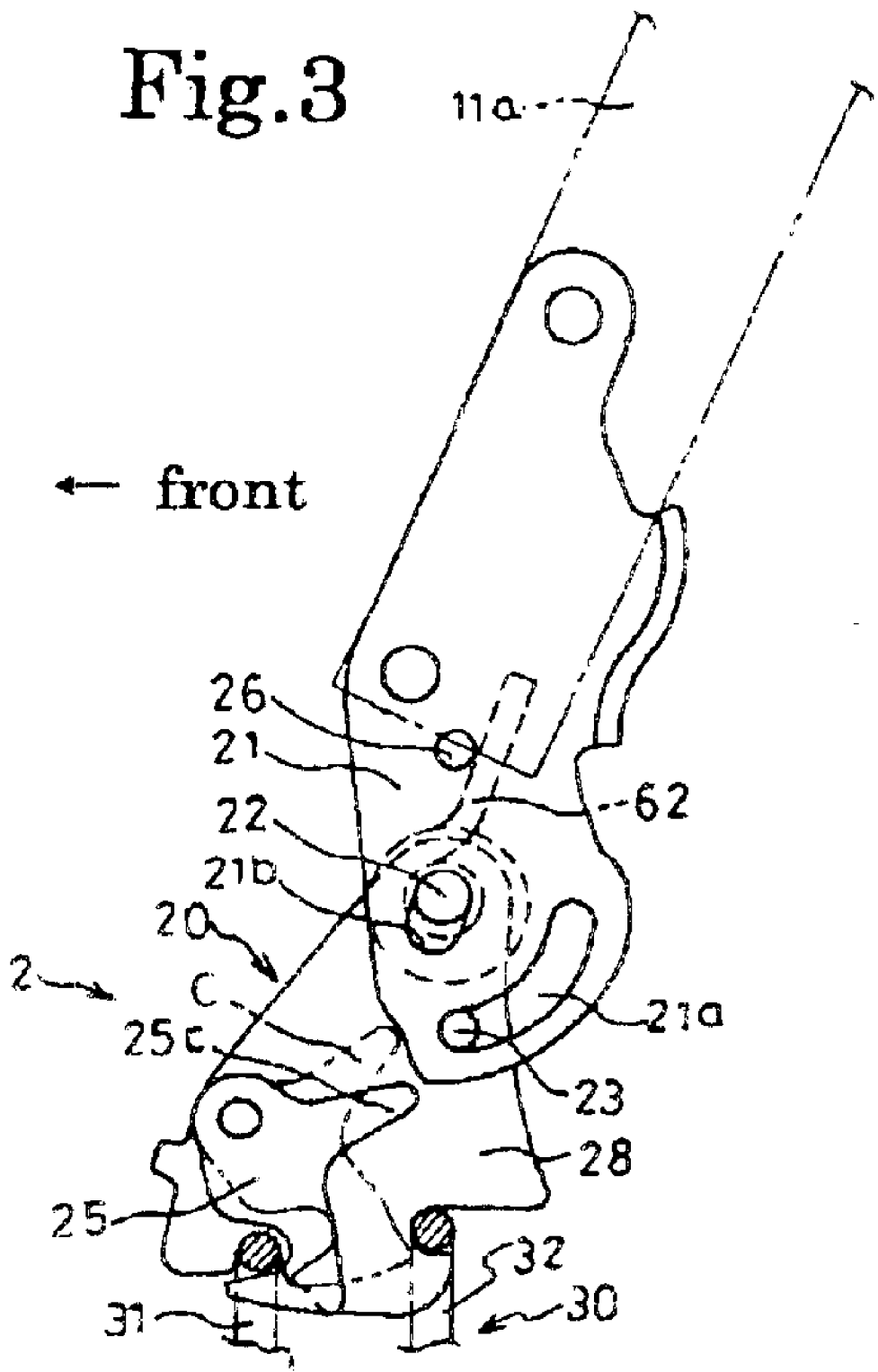
FIG. 3 is a side view of the first locking mechanism when the seat is in the tumbled condition.
Figure 4:
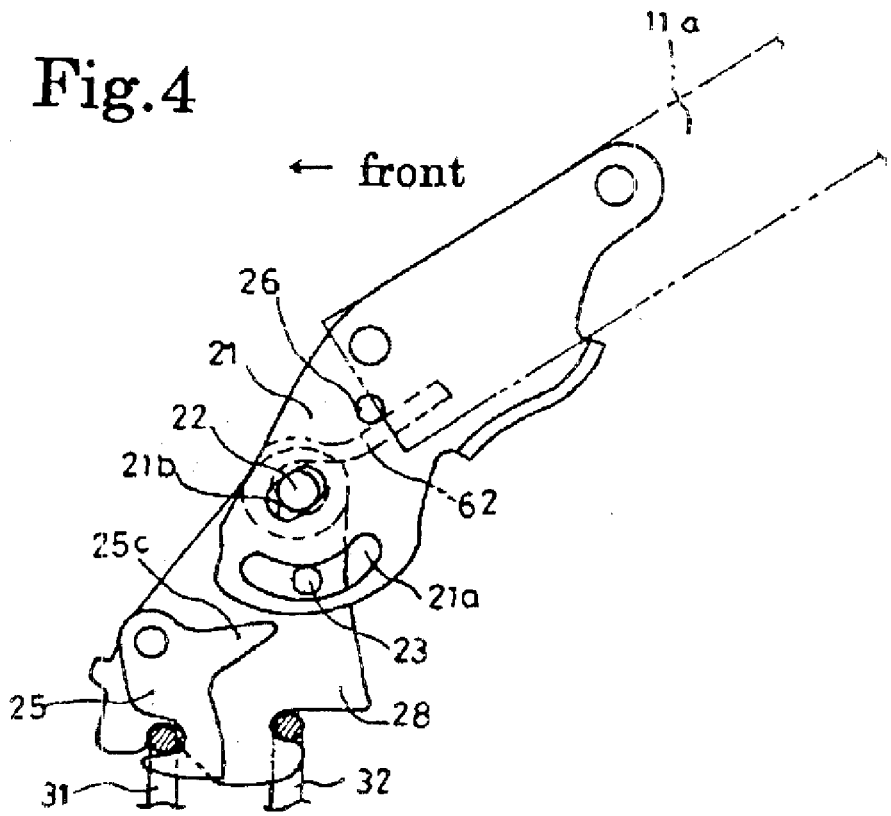
FIG. 4 is a side view of the first locking mechanism when the seat is restored from the tumbled condition to the folded condition.
Figure 5:
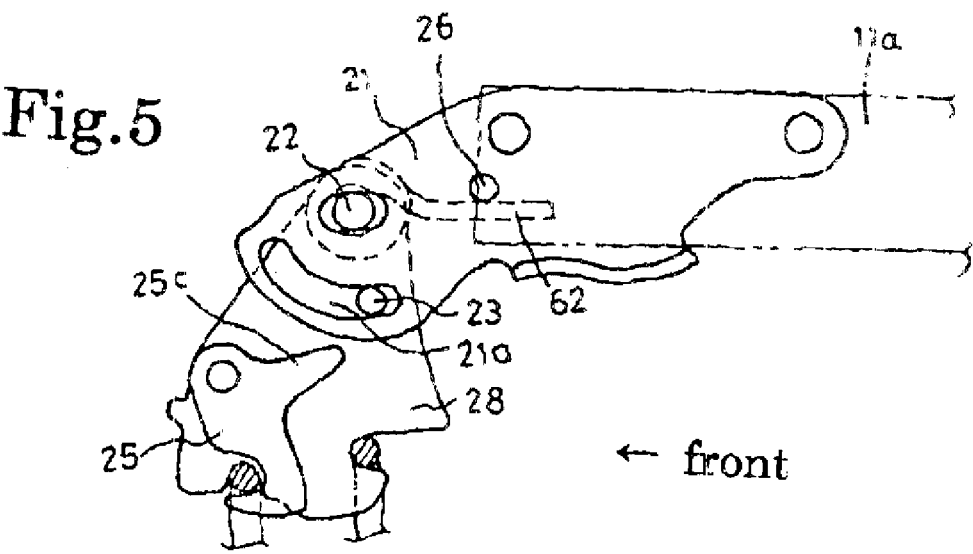
FIG. 5 is a side view of the first locking mechanism when the seat is in the folded condition.

As shown in FIG. 3 to FIG. 5, a projected portion 25c is formed on the hook 25. As shown in FIG. 3 by two dots line C, the projected portion 25c is rotable on counter clockwise direction, when the seat 10 is in the tumbled condition. However, the seat is not in the tumbled condition, the projection 25c is prevented from rotation by a lower edge of the upper bracket 21. This means that the first lock unit 20 is not released when the seat 10 is not in the tumbled condition.

On the fixing nut 29, a pipe 61 extending horizontally in the wide direction of the seat 10 is installed for connecting the first lock units 20 on the both side of the seat 10. On the outer surface of the pipe 61, a chock 63 is welded, an one end 62a of a tumble spring 62 formed in a shape of coil is hooked on a pin 26 fixed in a hole 21d on the upper bracket 21, and the other end 62b of the tumble spring 62 is hooked on the chock 63. The tumble spring 62 applies rotational force to the seat 10 forward so as to make the seat 10 be in the tumbled condition, that is, to counter clockwise direction in FIG. 1. The tumble spring 62 helps tumble or restoring operation of the seat 10 by balancing the weight of the seat 10.

Figure 6:
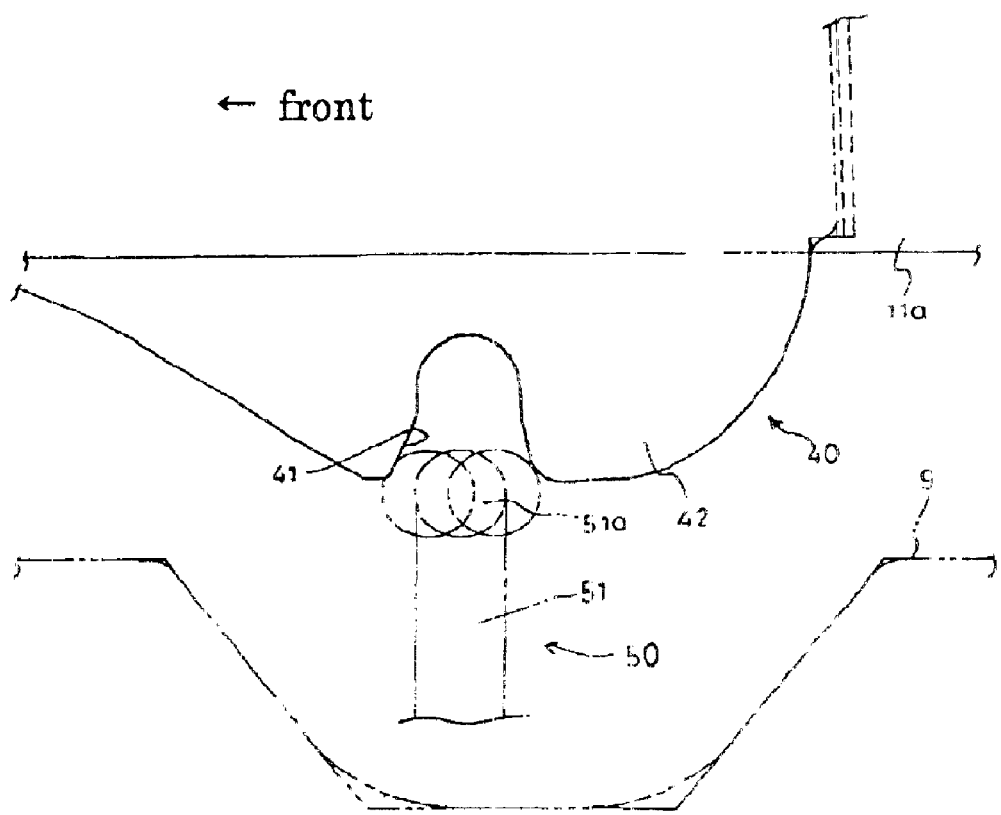
FIG. 6 is a side view of the second locking mechanism when the seat is in the folded condition.

As shown in FIG. 1 and FIG. 6, the second lock 4 includes second lock unit 40 which is installed on the rear lower portion of the frame 11a of the seat 10, and a second striker 50 which is fixed on the floor 9. The second striker 50 has a similar structure with the first striker 30, and has an engagement rod 51 with a horizontal engagement portion 51a.

The second lock unit 40 has a known mechanism as being applied for a vehicle door lock, and includes a latch 43 and pawl 44 engaging with the latch 43. The latch 43 engages with the second striker 50, and the engagement is maintained when the rotation of the latch 43 is stopped by the pawl 44. The engagement of the latch 43 is released from the second striker 50 by the pull operation of a cable 45 connected on the pawl 44. The cable 45 may be arranged so as to be pulled in cooperation with the folding of the seat back 12. When the second lock unit 40 is released, the seat 10 can be rotated forwardly around the rotational axis 22, and be brought in the tumbled condition.

As shown in FIG. 6, the bracket 42 included in the second lock unit 40 has a groove 41 opening downward. The lower portion of the groove 41 has wider width for easily acceptance of the horizontal engagement portion 51a of the engagement rod 51, even when the position of the horizontal engagement portion 51a or the seat 10 shifts forward or rearward by a reason of manufacturing or assembling tolerance, as shown by two dots line in FIG. 6.

The operation of the seat device 1 is explained herein after.

Figure 7:
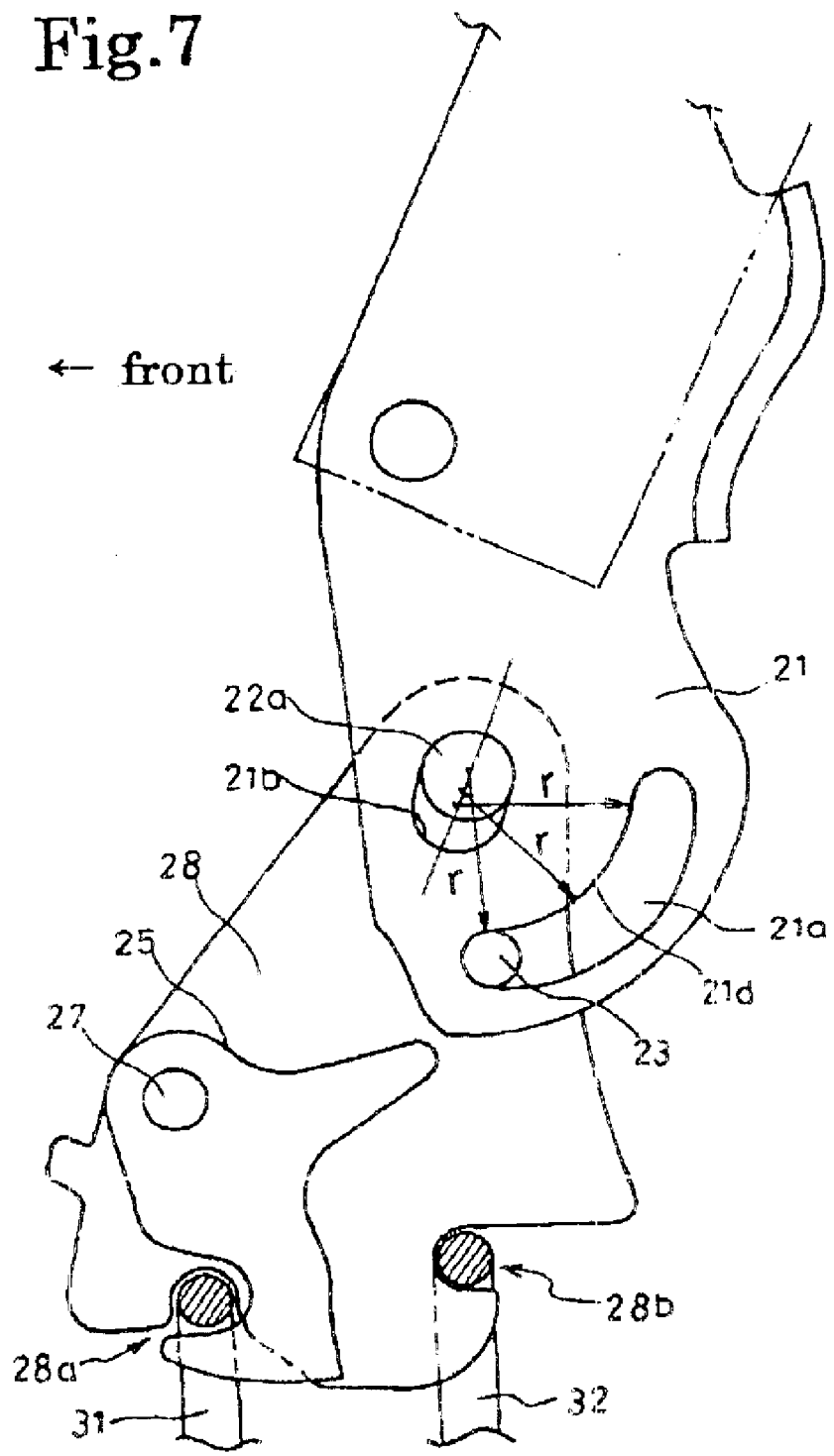
FIG. 7 is a side view of a cam hole profile formed on the first locking mechanism.

The each situation of the first lock 2 is shown in FIG. 3, FIG. 4 and FIG. 5, when the seat 10 is moved from the folded condition to the tumbled condition, or the restoring movement from the tumbled condition to the folded condition. Further, as shown in detail in FIG. 7, an upper inner edge of the cam hole 21a is formed with curbed profile, and when a radius of "r" is set as constant, a center of the radius "r" moves along the center line of the long hole 21b. Therefore, as shown in FIG. 7, the seat 10 is in the tumbled condition, the rotational axis 22 is in the upper most position of the long hole of the long hole 21b, then according to the restoring movement of the seat 10 from the tumbled condition to the folded condition (from the condition shown in FIG. 4 to the condition in FIG. 5), the rotational axis 22 gradually moves downward in FIG. 7. When the seat 10 is restored in the folded condition, the rotational axis 22a is positioned in the center of the long hole 21b in the length direction of the long hole 21b. In the case that the position of the second striker 50 deviates from the designed position fore or aft due to the tolerance of manufacturing or assembling, the seat 10 is movable with the range defined by the long hole 21b in either direction. Therefore the horizontal engagement portion 51a of the second striker 50 is smoothly conducted into the groove 41 and the second lock 4 achieves lock engagement.

As shown by two dots line in FIG. 1, the tumbled condition of the seat 10 is maintained by the tumble spring 62, also the seat 10 can be fastened by a seat belt or other fastening means for maintaining the tumbled condition, then an expanded floor space is available for much cargo.

As shown in FIG. 4 and FIG. 5, when the seat 10 is not in the tumbled condition, the hook 25 is prevented from being released, because the projection 25c formed on the hook 25 hits on the upper bracket 21. Only when the seat 10 is in the tumbled condition, the operation lever 64 can be turned against the coil spring 65 to release the hook 25 from the engagement rod 31.

What is claimed is:

1. A seat device adapted to be fixed to engagement members on a vehicle floor comprising:

a first engagement member supporting a front portion of a seat;

a second engagement member supporting a rear portion of the seat;

a first lock unit engagable with the first engagement member;

a second lock unit engagable with the second engagement member;

the first lock unit supported on the seat and including a bracket rotatably supported relative to the seat, the bracket being engagable with the first engagement member, wherein the first lock unit includes a rotation axis about which the seat is adapted to rotate relative to the bracket and a long hole through which the rotation axis passes, wherein the rotation axis moves along the long hole when an angle of the bracket relative to the seat is out of a predetermined range; and a pin fixed on the bracket, a cam hole for engaging with the pin, and an urging member applying an urging force to rotate the seat relative to the bracket, wherein the cam hole is provided with a cam surface profile to move the rotation axis to a predetermined position depending on an angle position of the seat relative to the bracket when the seat rotates relative to the bracket.

2. A seat device adapted to be fixed to engagement members on a vehicle floor comprising:

a first engagement member supporting a front portion of a seat;

a second engagement member supporting a rear portion of the seat;

a first lock unit engagable with the first engagement member;

a second lock unit engagable with the second engagement member;

the first lock unit supported on the seat and including a bracket rotatably supported relative to the seat, the bracket being engagable with the first engagement member, and a hook member supported on the bracket to maintain an engagement of the bracket with the first engagement member, wherein a contact portion is provided on the hook member for contacting a portion of the seat to prevent a release operation of the hook member when an angle of the bracket relative to the seat is out of a predetermined range, the first lock includes a rotation axis about which the seat is adapted to rotate relative to the bracket and a long hole through which the rotation axis passes, and the rotation axis is moved along the long hole when the seat is rotated relative to the bracket; and a pin fixed on the bracket, a cam hole receiving the pin, and an urging member applying an urging force to rotate the seat relative to the bracket, wherein the cam hole is provided with a cam surface profile to move the rotation axis to a predetermined position depending on an angle position of the seat relative to the bracket when the seat rotates relative to the bracket.

3. A seat device according to claim 1, wherein the bracket is a first bracket, and the long hole is provided in a second bracket which is fixed to the seat.

4. A seat device according to claim 3, wherein the cam hole is provided in the second bracket which is fixed to the seat.

5. A seat device according to claim 1, wherein the bracket is a first bracket, and the cam hole is provided in a second bracket which is fixed to the seat.

6. A seat device according to claim 2, wherein the bracket is a first bracket, and the long hole is provided in a second bracket which is fixed to the seat.

7. A seat device according to claim 6, wherein the cam hole is provided in the second bracket which is fixed to the seat.

8. A seat device according to claim 2, wherein the bracket is a first bracket, and the cam hole is provided in a second bracket which is fixed to the seat.

* * * * *